United States Patent
Mitra et al.

(10) Patent No.: US 8,671,703 B2
(45) Date of Patent: Mar. 18, 2014

(54) REFRIGERANT VAPOR COMPRESSION SYSTEM WITH FLASH TANK ECONOMIZER

(75) Inventors: Biswajit Mitra, Charlotte, NC (US); Yu H. Chen, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 845 days.

(21) Appl. No.: 12/599,585

(22) PCT Filed: May 14, 2007

(86) PCT No.: PCT/US2007/011539
§ 371 (c)(1),
(2), (4) Date: Sep. 24, 2010

(87) PCT Pub. No.: WO2008/140454
PCT Pub. Date: Nov. 20, 2008

(65) Prior Publication Data
US 2011/0023514 A1  Feb. 3, 2011

(51) Int. Cl.
*F25B 41/00* (2006.01)
*F25B 49/00* (2006.01)

(52) U.S. Cl.
USPC ............................. 62/196.1; 62/509; 62/513

(58) Field of Classification Search
USPC ................ 62/113, 196.1, 205, 509, 510, 513
See application file for complete search history.

(56) References Cited

U.S. PATENT DOCUMENTS

| | | |
|---|---|---|
| 4,707,996 A | 11/1987 | Vobach |
| 5,056,329 A | 10/1991 | Wilkinson |
| 5,174,123 A | 12/1992 | Erickson |
| 6,058,729 A | 5/2000 | Lifson et al. |
| 6,385,980 B1 | 5/2002 | Sienel |
| 6,438,978 B1 | 8/2002 | Bessler |
| 6,679,074 B2 | 1/2004 | Hanson |
| 6,694,750 B1 | 2/2004 | Lifson et al. |
| 7,096,679 B2 | 8/2006 | Manole |
| 7,114,349 B2 | 10/2006 | Lifson et al. |
| 2004/0129015 A1 | 7/2004 | Apparao et al. |
| 2005/0132729 A1 | 6/2005 | Manole |

(Continued)

FOREIGN PATENT DOCUMENTS

| | | |
|---|---|---|
| EP | 0976991 A2 | 2/2000 |
| EP | 1577622 A2 | 9/2005 |

(Continued)

OTHER PUBLICATIONS

International Search Report and Written Opinion mailed Dec. 20, 2007 (12 pgs.).

(Continued)

*Primary Examiner* — Marc Norman
(74) *Attorney, Agent, or Firm* — Cantor Colburn LLP (57) ABSTRACT

A refrigerant vapor compression system includes a flash tank disposed in series refrigerant flow relationship in the refrigerant circuit intermediate a refrigerant heat rejection heat exchanger and a refrigerant heat absorption heat exchanger. A primary expansion valve is interdisposed in the refrigerant circuit upstream of the refrigerant heat absorption heat exchanger and a secondary expansion valve is interdisposed in the refrigerant circuit upstream of the flash tank. A refrigerant vapor line is provided to direct refrigerant vapor from the flash tank to an intermediate pressure stage of the compression process. A refrigerant-to-refrigerant heat exchanger operates to transfer heat from refrigerant flowing through the primary refrigerant circuit to refrigerant flowing through the refrigerant vapor line.

16 Claims, 2 Drawing Sheets

(56) References Cited

U.S. PATENT DOCUMENTS

| | | | |
|---|---|---|---|
| 2006/0037336 A1* | 2/2006 | Bush | 62/197 |
| 2006/0037354 A1 | 2/2006 | Cho et al. | |
| 2007/0012072 A1 | 1/2007 | Qualls et al. | |

FOREIGN PATENT DOCUMENTS

| | | |
|---|---|---|
| EP | 1686330 A2 | 8/2006 |
| JP | 61153458 | 7/1986 |
| JP | H0367958 A | 3/1991 |
| JP | H0545007 A | 2/1993 |
| JP | H10318614 A | 12/1998 |
| JP | 11014167 | 1/1999 |
| JP | 11344265 | 12/1999 |
| JP | 2002195673 A | 7/2002 |
| JP | 2006090563 | 4/2006 |
| JP | 2007093046 A | 4/2007 |
| WO | WO9521359 A1 | 8/1995 |
| WO | WO9910686 A1 | 3/1999 |

OTHER PUBLICATIONS

International Preliminary Report on Patentability mailed Nov. 26, 2009 (9 pgs.).

Huff, H-J et al., "Options for a Two-Stage Transcriptional Carbon Dioxide Cycle", IIR Gustave Lorentzen Conference On Natural Working Fluids.Joint Conference Of The International Institute Of Refrigeration Section B And E, XX, XX, Sep. 17, 2002, pp. 158-164.

European Search Report, Supplementary European Search Report, and the European Search Opinion for International Application No. PCT/US2007/011539, May 3, 2013, 10 pages.

* cited by examiner

REFRIGERANT VAPOR COMPRESSION SYSTEM WITH FLASH TANK ECONOMIZER

FIELD OF THE INVENTION

This invention relates generally to refrigerant vapor compression systems and, more particularly, to improving performance in a refrigerant vapor compression system having a flash tank economizer.

BACKGROUND OF THE INVENTION

Refrigerant vapor compression systems are well known in the art and commonly used for conditioning air to be supplied to a climate controlled comfort zone within a residence, office building, hospital, school, restaurant or other facility. Refrigerant vapor compression systems are also commonly used in refrigerating air supplied to display cases, merchandisers, freezer cabinets, cold rooms or other perishable/frozen product storage area in commercial establishments.

Refrigerant vapor compression systems are also commonly used in transport refrigeration systems for refrigerating air supplied to a temperature controlled cargo space of a truck, trailer, container or the like for transporting perishable/frozen items by truck, rail, ship or intermodally. Refrigerant vapor compression systems used in connection with transport refrigeration systems are generally subject to more stringent operating conditions due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity and, refrigerant charge to rapidly pull down the temperature of product loaded into the cargo space at ambient temperature, but also operate efficiently at low load with excess refrigerant charge when maintaining a stable product temperature during transport. Additionally, transport refrigerant vapor compression systems are subject to vibration and movements not experienced by stationary refrigerant vapor compression systems. Thus, the use of a conventional refrigerant accumulator in the suction line upstream of the compressor suction inlet to store excess refrigerant liquid would be subject to sloshing during movement that could result in refrigerant liquid being undesirably carried through the suction line into the compressor via the suction inlet thereto.

Traditionally, most of these refrigerant vapor compression systems operate at subcritical refrigerant pressures and typically include a compressor, a condenser, and an evaporator, and expansion device, commonly an expansion valve, disposed upstream, with respect to refrigerant flow, of the evaporator and downstream of the condenser. These basic refrigerant system components are interconnected by refrigerant lines in a closed refrigerant circuit, arranged in accord with known refrigerant vapor compression cycles, and operated in the subcritical pressure range for the particular refrigerant in use. Refrigerant vapor compression systems operating in the subcritical range are commonly charged with fluorocarbon refrigerants such as, but not limited to, hydrochlorofluorocarbons (HCFCs), such as R22, and more commonly hydrofluorocarbons (HFCs), such as R134a, R410A, R404A and R407C.

In today's market, greater interest is being shown in "natural" refrigerants, such as carbon dioxide, for use in air conditioning and transport refrigeration systems instead of HFC refrigerants. However, because carbon dioxide has a low critical temperature, most refrigerant vapor compression systems charged with carbon dioxide as the refrigerant are designed for operation in the transcritical pressure regime. In refrigerant vapor compression systems operating in a subcritical cycle, both the condenser and the evaporator heat exchangers operate at refrigerant temperatures and pressures below the refrigerant's critical point. However, in refrigerant vapor compression systems operating in a transcritical cycle, the heat rejection heat exchanger, which is a gas cooler rather than a condenser, operates at a refrigerant temperature and pressure in excess of the refrigerant's critical point, while the evaporator operates at a refrigerant temperature and pressure in the subcritical range. Thus, for a refrigerant vapor compression system operating in a transcritical cycle, the difference between the refrigerant pressure within the gas cooler and refrigerant pressure within the evaporator is characteristically substantially greater than the difference between the refrigerant pressure within the condenser and the refrigerant pressure within the evaporator for a refrigerant vapor compression system operating in a subcritical cycle.

It is also common practice to incorporate an economizer into the refrigerant circuit for increasing the capacity of the refrigerant vapor compression system. For example, in some systems, a refrigerant-to-refrigerant heat exchanger is incorporated into the refrigerant circuit as an economizer. U.S. Pat. No. 6,058,729 discloses a subcritical refrigerant vapor compression system for a transport refrigeration unit incorporating a refrigerant-to-refrigerant heat exchanger into the refrigerant circuit as an economizer. The disclosed system also includes a suction modulation valve (SMV) for throttling refrigerant flow to the suction inlet of the compressor and an intermediate pressure-to-suction pressure unload circuit for compressor capacity control. U.S. Pat. No. 7,114,349 discloses a refrigerant vapor compression system with a common economizer and liquid-suction heat exchanger interdisposed in the refrigerant circuit downstream of the condenser with respect to refrigerant flow and upstream of the evaporator with respect to refrigerant flow. Through various bypass lines and manipulation of various open/closed solenoid valves associated with the bypass lines, the common heat exchanger may be operated either as an economizer heat exchanger or as a liquid-suction heat exchanger. U.S. Pat. No. 6,694,750 discloses a subcritical refrigeration system that includes a first refrigerant-to-refrigerant heat exchanger economizer and a second refrigerant-to-refrigerant heat exchanger economizer disposed in series in the refrigerant circuit between the condenser and the evaporator.

In some systems, a flash tank economizer is incorporated into the refrigerant circuit between the condenser and the evaporator. In such case, the refrigerant leaving the condenser is expanded through an expansion device, such as a thermostatic expansion valve or an electronic expansion valve, prior to entering the flash tank wherein the expanded refrigerant separates into a liquid refrigerant component and a vapor refrigerant component. The vapor component of the refrigerant is thence directed from the flash tank into an intermediate pressure stage of the compression process. The liquid component of the refrigerant is directed from the flash tank through the system's main expansion valve prior to entering the evaporator. U.S. Pat. No. 5,174,123 discloses a subcritical vapor compression system incorporating a flash tank economizer in the refrigerant circuit between the condenser and the evaporator. U.S. Pat. No. 6,385,980 discloses a transcritical refrigerant vapor compression system incorporating a flash tank economizer in the refrigerant circuit between the gas cooler and the evaporator.

As noted before, transport refrigerant vapor compression systems are subject to vibration and movements not experienced by stationary refrigerant vapor compression systems. Thus, refrigerant liquid collecting in the lower portion of a flash tank economizer could be subject to sloshing during movement that might result in refrigerant liquid being entrained in the refrigerant vapor collecting within the flash tank above the refrigerant. Additionally, during certain operating modes, for example during temperature pull down of the cargo box following initial start-up or during of temperature control operation to a high temperature set point, excessive refrigerant mass flow through the flash tank could result in a high level of refrigerant liquid with the flash tank Any liquid refrigerant carried over in the refrigerant vapor passing from the flash tank into the compression process could be detrimental to compressor performance, as well as adversely impact system capacity and efficiency.

SUMMARY OF THE INVENTION

In an aspect of the invention, a refrigerant vapor compression system is provided having a primary refrigerant circuit including a refrigerant compression device, a refrigerant heat rejection heat exchanger disposed downstream of the compression device, a refrigerant heat absorption heat exchanger disposed downstream of the refrigerant cooling heat exchanger, a primary expansion device disposed in the refrigerant circuit downstream of the refrigerant cooling heat exchanger and upstream of the refrigerant heating heat exchanger, and a flash tank disposed in the refrigerant circuit downstream of the refrigerant heat rejection heat exchanger and upstream of the primary expansion device. The flash tank defines a separation chamber wherein refrigerant in a liquid state collects in a lower portion of the separation chamber and refrigerant in a vapor state in a portion of the separation chamber above the liquid refrigerant. A secondary expansion device is disposed in the refrigerant circuit in operative association with and upstream of the flash tank. A refrigerant vapor line establishes refrigerant flow communication between an upper portion of the separation chamber and an intermediate pressure stage of the compression device. A refrigerant-to-refrigerant heat exchanger is provided to transfer heat from refrigerant flowing through the primary refrigerant circuit to refrigerant flowing through said refrigerant vapor line.

In an embodiment, the refrigerant-to-refrigerant heat exchanger has a first refrigerant pass and a second refrigerant pass disposed in heat exchange relationship, the first refrigerant pass in refrigerant flow communication with the primary refrigerant circuit and the second refrigerant pass in refrigerant flow communication with the refrigerant vapor line. In an embodiment, the first refrigerant pass of the refrigerant-to-refrigerant heat exchanger is disposed in the primary refrigerant circuit downstream of the refrigerant cooling heat exchanger and upstream of the secondary expansion device.

The refrigerant compression vapor system may also include a first economizer flow control device interdisposed in the refrigerant vapor line intermediate the flash tank and an intermediate stage of the compression device, a refrigerant bypass line establishing refrigerant flow communication between the refrigerant vapor line at a point upstream with respect to refrigerant flow of the first economizer flow control device and the refrigerant vapor line at a point downstream with respect to refrigerant flow of the first economizer flow control device, with the second refrigerant pass of the refrigerant-to-refrigerant heat exchanger interdisposed in the refrigerant bypass line; and a second economizer flow control device interdisposed in the refrigerant bypass line upstream with respect to refrigerant flow of the second refrigerant pass of the refrigerant-to-refrigerant heat exchanger. A controller may be provided in operative association with the first economizer flow control device and the second economizer flow control device for selectively controlling the positioning of each of the first and second economizer flow control devices between its respective open and closed positions. The first economizer flow control device and the second economizer flow control device may each be a solenoid valve having a first open position and a second closed position.

In an embodiment, the refrigerant vapor compression system also includes a refrigerant vapor line establishing refrigerant flow communication between a upper portion of the separation chamber and an intermediate pressure stage of the compression device and a suction pressure portion of the primary refrigerant circuit, a refrigerant liquid injection line establishes refrigerant flow communication between a lower portion of the separation chamber and an intermediate pressure stage of the compression device and a suction pressure portion of the primary refrigerant circuit, and a compressor unload line between the intermediate pressure stage of the compression device and a suction pressure portion of the primary refrigerant circuit. In this embodiment, in addition to the first and second economizer flow control devices, a third flow control device may be interdisposed in an upstream portion of the refrigerant liquid line, a fourth flow control device may be disposed upstream with respect to refrigerant flow of the intermediate pressure stage of the compression device and downstream with respect to refrigerant flow of both the first and second economizer flow control devices and of the third flow control device, and a fifth flow control device may be disposed upstream with respect to refrigerant flow of the suction pressure portion of the primary refrigerant circuit and downstream with respect to refrigerant flow of both the first and second economizer flow control devices and of the third flow control device

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
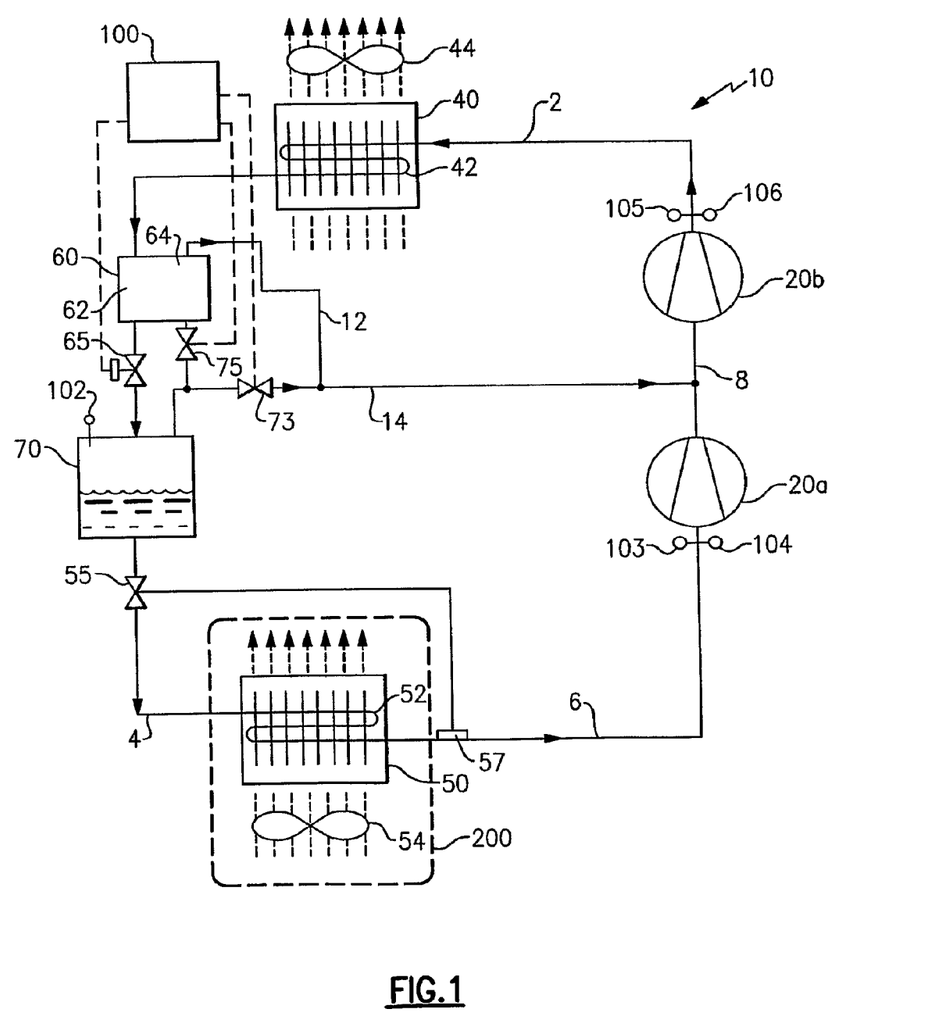
FIG. 1 is a schematic diagram illustrating a first exemplary embodiment of a refrigerant vapor compression system in accord with the invention.
Figure 2:
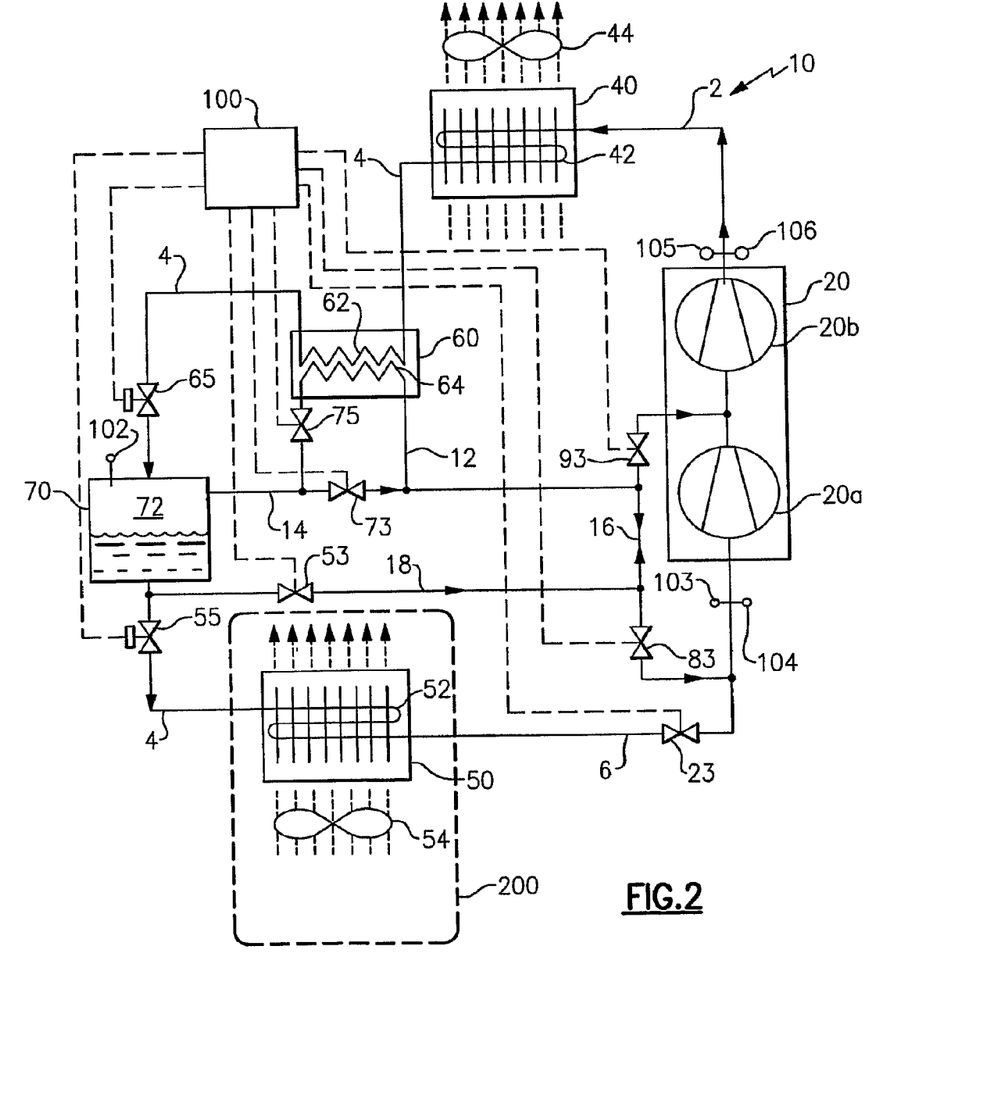
FIG. 2 is a schematic diagram illustrating a second exemplary embodiment of a refrigerant vapor compression system in accord with the invention.

Referring now to FIGS. 1 and 2, there are depicted therein exemplary embodiments of a refrigerant vapor compression system 10 suitable for use in a transport refrigeration system for refrigerating the air or other gaseous atmosphere within the temperature controlled cargo space of a truck, trailer, container or the like for transporting perishable/frozen goods. The refrigerant vapor compression system 10 is also suitable for use in conditioning air to be supplied to a climate controlled comfort zone within a residence, office building, hospital, school, restaurant or other facility. The refrigerant vapor compression system could also be employed in refrigerating air supplied to display cases, merchandisers, freezer cabinets, cold rooms or other perishable/frozen product storage areas in commercial establishments.

The refrigerant vapor compression system 10 is particularly adapted for operation in a transcritical cycle with a low critical temperature refrigerant, such as for example, but not limited to, carbon dioxide. However, it is to be understood that the refrigerant vapor compression system 10 may also be operated in a subcritical cycle with a higher critical such as conventional hydrochlorofluorocarbon and hydrofluorocarbon refrigerants. The refrigerant vapor compression system 10 includes a multi-step compression device 20, a refrigerant heat rejecting heat exchanger 40, a refrigerant heat absorbing heat exchanger 50, also referred to herein as an evaporator, and a primary expansion valve 55, such as for example a thermostatic expansion valve as depicted in FIG. 1 or an electronic expansion valve as depicted in FIG. 2, operatively associated with the evaporator 50, with refrigerant lines 2, 4 and 6 connecting the aforementioned components in a primary refrigerant circuit.

In a refrigerant vapor compression system operating in a transcritical cycle, the refrigerant heat rejection heat exchanger 40 constitutes a gas cooler through which supercritical refrigerant passes in heat exchange relationship with a cooling medium, such as for example, but not limited to, ambient air or water, and may be also be referred to herein as a gas cooler. In a refrigerant vapor compression system operating in a subcritical cycle, the refrigerant heat rejecting heat exchanger 40 would constitute a refrigerant condensing heat exchanger through which hot, high pressure refrigerant passes in heat exchange relationship with the cooling medium. In the depicted embodiments, the refrigerant heat rejecting heat exchanger 40 includes a firmed tube heat exchanger 42, such as for example a fin and round tube heat exchange coil or a fin and mini-channel flat tube heat exchanger, through which the refrigerant passes in heat exchange relationship with ambient air being drawn through the firmed tube heat exchanger 42 by the fan(s) 44 associated with the refrigerant heat rejection heat exchanger 40.

The refrigerant heat absorption heat exchanger 50 serves an evaporator wherein refrigerant liquid is passed in heat exchange relationship with a fluid to be cooled, most commonly air, drawn from and to be returned to a temperature controlled environment 200, such as the cargo box of a refrigerated transport truck, trailer or container, or a display case, merchandiser, freezer cabinet, cold room or other perishable/frozen product storage area in a commercial establishment, or to a climate controlled comfort zone within a residence, office building, hospital, school, restaurant or other facility. In the depicted embodiments, the refrigerant heat absorbing heat exchanger 50 comprises a finned tube heat exchanger 52 through which refrigerant passes in heat exchange relationship with air drawn from and returned to the refrigerated cargo box 200 by the evaporator fan(s) 54 associated with the evaporator 50. The finned tube heat exchanger 52 may comprise, for example, a fin and round tube heat exchange coil or a fin and mini-channel flat tube heat exchanger.

The compression device 20 functions to compress the refrigerant and to circulate refrigerant through the primary refrigerant circuit as will be discussed in further detail hereinafter. In the exemplary embodiment depicted in FIG. 1, the compression device 20 may comprise a pair of independent compressors 20a and 20b, connected in series refrigerant flow relationship in the primary refrigerant circuit via a refrigerant line 8 connecting the discharge outlet port of the first compressor 20a in refrigerant flow communication with the suction inlet port of the second compressor 20b. In the exemplary embodiment depicted in FIG. 2, the compression device 20 may comprise a single multiple stage refrigerant compressor, such as for example a scroll compressor, a screw compressor or a reciprocating compressor, disposed in the primary refrigerant circuit and having a first compression stage 20a and a second compression stage 20b. The first and second compression stages are disposed in series refrigerant flow relationship with the refrigerant leaving the first compression stage passing directly to the second compression stage for further compression. In the independent compressor embodiment, the compressors 20a and 20b may be scroll compressors, screw compressors, reciprocating compressors, rotary compressors or any other type of compressor or a combination of any such compressors.

Additionally, the refrigerant vapor compression system 10 includes a flash tank economizer 70 interdisposed in refrigerant line 4 of the primary refrigerant circuit downstream with respect to refrigerant flow of the refrigerant heat rejection heat exchanger 40 and upstream with respect to refrigerant flow of the evaporator 50. A secondary expansion device 65 is interdisposed in refrigerant line 4 in operative association with and upstream of the flash tank economizer 70. The secondary expansion device 65 may be an electronic expansion valve, such as depicted in FIGS. 1 and 2, or a fixed orifice expansion device. Refrigerant traversing the secondary expansion device 65 is expanded to a lower subcritical pressure sufficient to establish a mixture of refrigerant in a vapor state and refrigerant in a liquid state. The flash tank economizer 70 defines a separation chamber 72 wherein refrigerant in the liquid state collects in a lower portion of the separation chamber and refrigerant in the vapor state collects in the portion of the separation chamber 72 above the liquid refrigerant.

Liquid refrigerant collecting in the lower portion of the flash tank economizer 70 passes therefrom through refrigerant line 4 and traverses the primary refrigerant circuit expansion valve 55 interdisposed in refrigerant line 4 upstream with respect to refrigerant flow of the evaporator 50. As this liquid refrigerant traverses the primary expansion device 55, it expands to a lower pressure and temperature before entering the evaporator 50. The evaporator 50 constitutes a refrigerant evaporating heat exchanger through which expanded refrigerant passes in heat exchange relationship with the air to be cooled, whereby the refrigerant is vaporized and typically superheated.

As in conventional practice, the primary expansion device 55 meters the refrigerant flow through the refrigerant line 4 to maintain a desired level of superheat in the refrigerant vapor leaving the evaporator 50 to ensure that no liquid is present in the refrigerant leaving the evaporator. As noted before, the primary expansion valve 55 may be an electronic expansion valve, as depicted in FIG. 2, in which case the expansion valve 55 meters refrigerant flow in response to a control signal from a controller to maintain a desired suction temperature or suction pressure in refrigerant line 6 on the suction side of the compression device 20. The primary expansion device 55 may also be a thermostatic expansion valve, as depicted in FIG. 1, in which case the expansion valve 55 meters refrigerant flow in response to a signal indicative of the refrigerant temperature or pressure sensed by the sensing device, which may be a conventional temperature sensing element 57, such as a bulb or thermocouple mounted to the refrigerant line 6 in the vicinity of the evaporator outlet. The low pressure refrigerant vapor leaving the evaporator 50 returns through refrigerant line 6 to the suction port of the first compression stage or first compressor 20a of the compression device 20.

The refrigerant vapor compression system 10 also includes an economizer refrigerant vapor line 14 that establishes refrigerant flow communication between an upper portion of the separation chamber 72 of the flash tank economizer 70 and an intermediate stage of the compression process. In the exemplary embodiment of the refrigerant vapor compression system 10 depicted in FIG. 1, injection of refrigerant vapor or refrigeration liquid into the intermediate pressure stage of the compression process would be accomplished by injection of the refrigerant vapor into the refrigerant passing from the discharge outlet of the first compressor 20a to the suction inlet of the second compressor 20b. For example, if the compression device 20 is a pair of compressors 20a, 20b, such as a pair of scroll compressors, or screw compressors, or reciprocating compressors, connected in series, the economizer refrigerant vapor line 14 directs refrigerant vapor into a refrigerant line 8 that connects the discharge outlet port of the first compressor 20a in refrigerant flow communication with the suction inlet port of the second compressor 20b. In the exemplary embodiment of the refrigerant vapor compression system 10 depicted in FIG. 2, injection of refrigerant vapor into the intermediate pressure stage of the compression process would be accomplished by injection of the refrigerant vapor into the refrigerant passing from the first compression stage 20a into the second compression stage 20b of a single compressor. For example, if the compression device 20 is a multi-stage reciprocating compressor having a first bank and a second bank of cylinders, the economizer refrigerant vapor line 14 directs refrigerant vapor directly into an intermediate pressure stage of the reciprocating compressor between the first cylinder bank 20a and the second cylinder bank 20b. If the compression device 20 is a single scroll compressor or a single screw compressor, the economizer refrigerant vapor line 14 directs refrigerant vapor into an injection port of the compressor opening to the compression chamber thereof at an intermediate pressure of the compression process.

The refrigerant vapor compression system 10 includes a first economizer flow control device 73 interdisposed in the economizer refrigerant vapor line 14, a refrigerant line 12 which provides a bypass around the first economizer flow control valve 73, and a second economizer flow control valve 75 interdisposed in refrigerant line 12 in parallel flow control relationship with the first economizer flow control device 73. The refrigerant line 12 taps into the economizer refrigerant vapor line 14 at a location upstream of the first economizer flow control valve 73 and reconnects to the economizer refrigerant vapor line 14 at a location downstream of the first economizer flow control device 73. The first economizer flow control device 73 and the second economizer flow control device 75 may each comprise a flow control valve selectively positionable between an open position wherein refrigerant flow may pass through its respective associated refrigerant line, and a closed position wherein each valve blocks the flow of refrigerant through its respective associated refrigerant line. In an embodiment, the first and second economizer flow control devices 73 and 75 comprise two-position solenoid valves of the type selectively positionable between a first open position and a second closed position.

The refrigerant vapor compression system 10 further includes a refrigerant-to-refrigerant heat exchanger 60, also referred to herein as an economizer vapor conditioning heat exchanger, having a first refrigerant pass 62 and a second refrigerant pass 64 disposed in heat exchange relationship. The first refrigerant pass 62 is in refrigerant flow communication with refrigerant line 4. The second refrigerant pass 64 is in refrigerant flow communication with refrigerant line 12. In an embodiment, the first refrigerant pass 62 is interdisposed in refrigerant line 4 of the primary refrigerant circuit intermediate the refrigerant heat rejection heat exchanger 40 and the secondary expansion device 65 and a second refrigerant pass 64 is interdisposed in refrigerant line 12 downstream with respect to refrigerant flow of the second economizer flow control device 75. The refrigerant-to-refrigerant heat exchanger 60 may be a brazed plate heat exchanger, a tube-in-tube heat exchanger, a tube-on-tube heat exchanger or a shell and tube heat exchanger. The first refrigerant pass 62 and the second refrigerant pass 64 of the refrigerant-to-refrigerant heat exchanger 60 may be arranged in a parallel flow heat exchange relationship or a counter flow heat exchange relationship. The refrigerant-to-refrigerant heat exchanger 60 may also comprise a thermoelectric heat exchanger for driving heat from the hotter, higher pressure refrigerant to the colder, lower pressure refrigerant.

High pressure refrigerant vapor having traversed the refrigerant heat rejection heat exchanger 40 passes through the first refrigerant pass 62 as it traverses refrigerant line 4 from the refrigerant heat rejection heat exchanger 40 to the flash tank 70. When the first economizer flow control device 73 is open and the second economizer flow control device 75 is closed, refrigerant vapor from the flash tank 70 passes directly through the economizer refrigerant vapor line 14 and into an intermediate pressure stage of the compression process, without passing through the second refrigerant pass 64 of the economizer vapor conditioning heat exchanger 60.

However, when the first economizer flow control device 73 is closed and the second economizer flow control device 75 is open, refrigerant passing from the flash tank 70 through the economizer refrigerant vapor line 14 is diverted through the refrigerant bypass line 12 to pass through the second refrigerant pass 64 in heat exchange relationship with the higher pressure refrigerant passing through the first refrigerant pass 62 of the economizer vapor conditioning heat exchanger 60 before returning to the economizer refrigerant vapor line 14 downstream of the first economizer flow control valve 73 and into an intermediate pressure stage of the compression process. In this manner, the high pressure refrigerant, which would be a supercritical fluid if the system 10 is operating in a transcritical cycle, but a refrigerant liquid if the system 10 is operating in a subcritical cycle, passing through refrigerant line 4 is further cooled and the low pressure refrigerant vapor passing through refrigerant line 12 is thereby heated. The additional cooling of the high pressure refrigerant conditions the high pressure refrigerant by lowering the enthalpy of the high pressure refrigerant prior to expansion via the secondary expansion device 65. Therefore, the ratio of refrigerant vapor to refrigerant liquid collecting in the flash tank 70 following expansion is reduced, which improves separation of the refrigerant phases and results in less refrigerant vapor and more refrigerant liquid within the flash tank 70.

As noted before, liquid carry over in the refrigerant vapor passing from the flash tank 70 through the economizer refrigerant vapor line 14 to be injected into at intermediate pressure stage of the compression process could be detrimental to compressor performance, as well as adversely impact system capacity and efficiency. The heating of the refrigerant vapor passing through the second refrigerant pass 64 of the heat exchanger 60 via refrigerant line 12 ensures that any liquid that may be carried over from the separation chamber 72 of the flash tank 70 and remaining therein is evaporated and the refrigerant vapor is superheated before passing into an intermediate compression stage of the compression device 20.

In the exemplary embodiment depicted in FIG. 2, the refrigerant vapor compression system 10 also includes a refrigerant liquid line 18 that establishes refrigerant flow communication between a lower portion of the separation chamber 72 of the flash tank 70, typically via tapping refrigerant line 4 downstream of the flash tank 70 and upstream of the primary expansion valve 55, and an intermediate stage of the compression process and a suction pressure portion of the refrigerant circuit. Additionally, in this embodiment, the refrigerant vapor line 14 establishes refrigerant flow communication between an upper portion of the separation chamber 72 of the flash tank 70, not only to an intermediate stage of the compression process as in the embodiment depicted in FIG. 1, but also to a suction pressure portion of the refrigerant circuit. Additionally, as depicted in FIG. 2, the refrigerant vapor compression system 10 may also include a compressor unload line 16 that establishes refrigerant flow communication between an intermediate pressure stage of the compression device 20 and the suction pressure portion of the refrigerant circuit, such as refrigerant line 6 extending between the outlet of the evaporator 50 and the suction inlet of the compression device 20. In the exemplary embodiments depicted in FIG. 2, both an upstream portion of the refrigerant vapor line 14 and an upstream portion of the refrigerant liquid line 18 open in refrigerant flow communication with the compressor unload bypass line 16 and the compressor unload line 16 forms a downstream extension of both the refrigerant vapor line 14 and the refrigerant liquid line 18.

The refrigerant vapor compression system 10 may also include a control system including a controller 100 operatively associated with a plurality of flow control devices interdisposed in various refrigerant lines. As in conventional practice, in addition to monitoring ambient conditions, the controller 100 also monitors various operating parameters by means of various sensors operatively associated with the controller 100 and disposed at selected locations throughout the system. For example, in the exemplary embodiments depicted in FIGS. 1 and 2, a pressure sensor 102 is disposed in operative association with the flash tank 70 to sense the pressure within the flash tank 70, a temperature sensor 103 and a pressure sensor 104 are provided to sense the refrigerant suction temperature and pressure, respectively, and a temperature sensor 105 and a pressure sensor 106 are provided to sense refrigerant discharge temperature and pressure, respectively. The pressure sensors 102, 104, 106 may be conventional pressure sensors, such as for example, pressure transducers, and the temperature sensors 103 and 105 may be conventional temperature sensors, such as for example, thermocouples or thermistors. The controller 100 may also control operation of all electronic expansion valves in the system, as well as operation of the compression device 20, and the fans 44 and 54.

In the exemplary embodiment of the refrigerant vapor compression system 10 depicted in FIG. 1, the control system includes the first economizer flow control device 73 interdisposed in the economizer refrigerant vapor line 14 and the second economizer flow control device 75 interdisposed in the refrigerant bypass line 12. In operation, the controller 100 selectively positions each of the first economizer flow control device 73 and the second economizer flow control device 75 in response to operating conditions. If operating conditions are such that no liquid carry over is likely to be present in the refrigerant vapor passing out of the flash tank 70, the controller 100 positions the first flow control device 73 in its open position and positions the second flow control device 75 in its closed position, whereby the refrigerant vapor passing from the flash tank 70 proceeds via the economizer refrigerant vapor line 14 directly to an intermediate stage of the compression process without passing through the economizer vapor conditioning heat exchanger 60. However, if operating conditions are such that liquid carry over may be present in the refrigerant vapor passing out of the flash tank 70, the controller 100 positions the first flow control device 73 in its closed position and positions the second flow control device 75 in its open position, whereby the refrigerant vapor passing from the flash tank 70 proceeds via the economizer refrigerant vapor line 14 and refrigerant bypass line 12 through the second refrigerant pass 64 of the economizer vapor conditioning heat exchanger 60 before injection into an intermediate compression stage of the compression process.

In the exemplary embodiment of the refrigerant vapor compression system 10 depicted in FIG. 2, the control system includes not only the first economizer flow control device 73 interdisposed in the economizer refrigerant vapor line 14 and the second economizer flow control device 75 interdisposed in the refrigerant bypass line 12, but also a third flow control device 53 interdisposed in an upstream portion of refrigerant liquid injection line 18, a fourth flow control device 83 interdisposed in compressor unload bypass line 16 at a location intermediate the third flow control device and refrigerant line 6, and a fifth flow control device 93 interdisposed in compressor unload bypass line 16 at a location intermediate the first economizer flow control device 73 and the intermediate pressure stage of the compression process. Each of the aforementioned flow control devices 53, 83, 93 may also comprise a flow control valve selectively positionable between an open position wherein refrigerant flow may pass through the refrigerant line in which the flow control valve is interdisposed and a closed position wherein refrigerant flow is blocked through the refrigerant line in which the flow control valve is interdisposed. In an embodiment, each of the flow control valves 53, 83, 93 comprises a two-position solenoid valve of the type positionable selectively positionable under the control of the controller 100 between a first open position and a second closed position.

In operation of the refrigerant vapor compression system 10 as depicted in FIG. 2, the controller 100 not only controls the first and second economizer flow control valves 73 and 75 as described hereinbefore with respect to the FIG. 1 embodiment to selectively control economizer refrigerant vapor flow through the second refrigerant pass 64 of the evaporator refrigerant vapor conditioning heat exchanger 60, but also selectively controls the positioning of each of the plurality of flow control devices 53, 83, 93, in conjunction with the first and second economizer refrigerant flow control valves 73 and 75, between its respective open and closed positions to selectively direct refrigerant flow through the refrigerant vapor line 14 and the refrigerant liquid line 18.

Additionally, a suction modulation valve (SMV) 23 may be interdisposed in refrigerant line 6 intermediate the outlet of the evaporator 50 and the suction inlet to the compression device 20. In the exemplary embodiment depicted in FIG. 2, the suction modulation valve 23 is positioned in refrigerant line 6 between the outlet of the evaporator 50 and the point at which the compressor unload line 16 intersects refrigerant line 6. Operation of the suction modulation valve 23 is controlled by the controller 100. The controller 100 modulates the suction modulation valve 23 when necessary to increase or decrease the refrigerant flow through refrigerant line 6 to the suction inlet of the compression device 20 to control the cooling capacity of the refrigeration system 10. In an embodiment, the suction modulation valve 23 comprises a pulse width modulated solenoid valve.

The refrigerant vapor compression system 10 may be operated in selected operating modes depending upon load requirements and ambient conditions. The controller 100 determines the desired mode of operation based upon ambient conditions and various sensed system controls and then positions the various flow control valves accordingly. To operate the refrigerant vapor compression system 10 in its standard non-economized mode, i.e. standard cycle, the controller 100 closes each of the first economizer flow control devices 73 and 75 in the FIG. 1 embodiment, and also each of the flow control devices 53, 83 and 93 in the FIG. 2 embodiment, whereby the refrigerant circulates through the primary refrigerant circuit only, that is from the discharge outlet of compression device 20b through refrigerant lines 2, 4 and 6 traversing in order the gas cooler 40, the secondary expansion device 65, the flash tank 70, which in the non-economized mode functions as a receiver only, the primary expansion valve 55, the evaporator 50 and the suction modulation valve 23, if included in the system, and returning to the suction inlet of the compression device 20a.

The controller 100 may operate the refrigerant vapor compression system 10 in an economized mode wherein refrigerant circulates not only through the primary refrigerant circuit, but refrigerant vapor also passes from the flash tank economizer 70 into an intermediate pressure stage of the compression process. In the FIG. 1 embodiment, the controller 100 simply opens one of the first economizer flow control device 73 or the second economizer flow control device 75 to permit refrigerant vapor to flow from the flash tank economizer 70 to an intermediate pressure stage of the compression process as hereinbefore described. In the FIG. 2 embodiment, the controller 100 may operate the refrigerant vapor compression system 10 in an economized mode by closing the flow control devices 53 and 83 and opens one of the first economizer flow control device 73 or the second economizer flow control device 75 and also the flow control device 93, to permit refrigerant vapor to flow from the flash tank economizer 70 to an intermediate pressure stage of the compression process as hereinbefore described.

In the exemplary embodiment of the refrigerant vapor compression system 10 depicted in FIG. 2, in the economized cycle, the controller 100 responds to a high discharge temperature, as sensed by temperature sensor 105, by selectively opening the flow control devices 53 and 93, and one of the economizer flow control devices 73 or 75, while keeping flow control valve 83 closed, to direct refrigerant vapor through refrigerant line 14 and refrigerant liquid through refrigerant line 18 simultaneously into and through a portion of the compressor unload bypass line 16 into an intermediate pressure stage of the compression device 20. In this embodiment in the non-economized mode, the controller 100 controls the pressure in the flash tank 70 in response to the pressure sensed by the sensor 102 by selectively opening the one of the economizer flow control valves 73 or 75, as well as control valve 83, while keeping flow control devices 53 and 93 closed, to direct refrigerant vapor from the flash tank 70 through refrigerant vapor line 14 and a portion of the compressor unload bypass line 16 into refrigerant line 6. Also, in this non-economized mode, the controller 100 responds to a high discharge temperature as sensed by temperature sensor 105 by intermittently opening the valve 53 along with the above valving configuration to direct small amount of liquid through refrigerant line 18 and through a portion of compressor unload bypass line 16 into refrigerant line 6 to desuperheat refrigerant suction flow Additionally, in the FIG. 2 embodiment, the controller 100 can unload the compression device 20 in any operating mode, by closing both economizer flow control valves 73 and 75, and also closing flow control valve 53 and opening both flow control valves 83 and 93 in the compressor unload bypass line 16. With both flow control valves 83 and 93 open, the refrigerant flows out of an intermediate stage of the compression process through the compressor unload bypass line into refrigerant line 6 to directly return to the suction side of the compression device, thereby bypassing the second compression stage or second compressor 20a thereby unloading the compression device 20. This unloading of the compressor 20 through the compressor unload bypass line 16 may be implemented in response to a high compressor discharge refrigerant temperature, or for capacity reduction or compressor power reduction. If additional capacity shedding is needed, the controller 100 can also modulate the suction modulation valve 23, if included in the primary refrigerant circuit.

Those skilled in the art will recognize that many variations may be made to the particular exemplary embodiments described herein. For example, the second economizer flow control device 75 and the refrigerant bypass line could be eliminated and the second refrigerant pass 64 instead interdisposed in the economizer refrigerant vapor line 14 downstream with respect to the first economizer flow control device 73. In this embodiment, the first economizer flow control device 73 would not be a solenoid flow control valve, but instead either a thermostatic expansion valve set to maintain a fixed superheat in refrigerant line 14 downstream of the second refrigerant pass 64 of the economizer vapor conditioning heat exchanger 60 or an electronic expansion valve metering refrigerant under the controller 100 in response to a selected operating parameter.

Although the refrigerant vapor compression system of the invention is particularly adapted for operation in a transcritical cycle with a lower critical point refrigerant such as carbon dioxide, the system may also be operated in a subcritical cycle with a conventional higher critical point refrigerant. While the present invention has been particularly shown and described with reference to the exemplary embodiment as illustrated in the drawings, it will be understood by one skilled in the art that various changes in detail may be effected therein without departing from the spirit and scope of the invention as defined by the claims.

We claim:

1. A refrigerant vapor compression system comprising:
a primary refrigerant circuit including a refrigerant compression device, a refrigerant heat rejection heat exchanger for passing refrigerant received from said compression device at a high pressure in heat exchange relationship with a cooling medium, a refrigerant heat absorption heat exchanger for passing refrigerant at a low pressure refrigerant in heat exchange relationship with a heating medium, and a primary expansion device interdisposed in the primary refrigerant circuit downstream of said refrigerant cooling heat exchanger and upstream of said refrigerant heating heat exchanger;
a flash tank disposed in the primary refrigerant circuit downstream of the refrigerant heat rejection heat exchanger and upstream of said primary expansion device, said flash tank defining a separation chamber wherein refrigerant in a liquid state collects in a lower portion of said separation chamber and refrigerant in a vapor state in a portion of said separation chamber above the liquid refrigerant;
a secondary expansion device disposed in the primary refrigerant circuit in operative association with and upstream with of said flash tank;
a refrigerant vapor line establishing refrigerant flow communication between an upper portion of said separation chamber and an intermediate pressure stage of said compression device; and
a refrigerant-to-refrigerant heat exchanger operative to transfer heat from refrigerant flowing through the primary refrigerant circuit to refrigerant flowing through said refrigerant vapor line;

wherein said refrigerant-to-refrigerant heat exchanger has a first refrigerant pass and a second refrigerant pass disposed in heat exchange relationship, the first refrigerant pass interdisposed in the primary refrigerant circuit intermediate the refrigerant heat rejection heat exchanger and said secondary expansion valve, the second refrigerant pass in refrigerant flow communication with said refrigerant vapor line;

a first economizer flow control device interdisposed in said refrigerant vapor line intermediate said flash tank and an intermediate stage of said compression device;

a refrigerant bypass line establishing refrigerant flow communication between said refrigerant vapor line at a point upstream with respect to refrigerant flow of said first economizer flow control device and said refrigerant vapor line at a point downstream with respect to refrigerant flow of said first economizer flow control device, the second refrigerant pass of said refrigerant-to-refrigerant heat exchanger interdisposed in said refrigerant bypass line; and a second economizer flow control device interdisposed in said refrigerant bypass line upstream with respect to refrigerant flow of the second refrigerant pass of said refrigerant-to-refrigerant heat exchanger.

2. A refrigerant vapor compression system as recited in claim 1 wherein each of said first economizer flow control device and said second economizer flow control device comprises a solenoid valve having a first open position and a second closed position.

3. A refrigerant vapor compression system as recited in claim 1 further comprising a controller operatively associated with said first economizer flow control device and said second economizer flow control device and selectively controlling the positioning of each of said first and second economizer flow control devices between its respective open and closed positions.

4. A refrigerant vapor compression system as recited in claim 1 wherein said first economizer flow control valve comprises an electronic expansion valve.

5. A refrigerant vapor compression system as recited in claim 1 wherein said first economizer flow control valve comprises a thermostatic expansion valve.

6. A refrigerant vapor compression system as recited in claim 1 wherein said primary expansion device comprises an electronic expansion valve.

7. A refrigerant vapor compression system as recited in claim 1 wherein said primary expansion device comprises a thermostatic expansion valve.

8. A refrigerant vapor compression system as recited in claim 1 wherein said secondary expansion device comprises an electronic expansion valve.

9. A refrigerant vapor compression system as recited in claim 1 wherein said secondary expansion device comprises a fixed orifice expansion device.

10. A refrigerant vapor compression system as recited in claim 1 wherein said compression device comprises a single compressor having at least two compression stages.

11. A refrigerant vapor compression system as recited in claim 1 wherein said compression device comprises at least two compressors disposed in the refrigerant circuit in a series relationship with respect to refrigerant flow.

12. A refrigerant vapor compression system comprising:
a primary refrigerant circuit including a refrigerant compression device, a refrigerant heat rejection heat exchanger for passing refrigerant received from said compression device at a high pressure in heat exchange relationship with a cooling medium, a refrigerant absorption heat exchanger for passing refrigerant at a low pressure refrigerant in heat exchange relationship with a heating medium, and a primary expansion device interdisposed in the primary refrigerant circuit downstream of said refrigerant cooling heat exchanger and upstream of said refrigerant heating heat exchanger;

a flash tank disposed in the primary refrigerant circuit downstream of the refrigerant heat rejection heat exchanger and upstream of said primary expansion device, said flash tank defining a separation chamber wherein refrigerant in a liquid state collects in a lower portion of said separation chamber and refrigerant in a vapor state in a portion of said separation chamber above the liquid refrigerant;

a secondary expansion device disposed in the primary refrigerant circuit in operative association with and upstream with of said flash tank;

a refrigerant vapor line establishing refrigerant flow communication between an upper portion of said separation chamber and an intermediate pressure stage of said compression device and a suction pressure portion of said primary refrigerant circuit;

a refrigerant liquid line establishing refrigerant flow communication between a lower portion of said separation chamber and an intermediate pressure stage of said compression device and a suction pressure portion of said primary refrigerant circuit; and a refrigerant-to-refrigerant heat exchanger operative to transfer heat from refrigerant flowing through the primary refrigerant circuit to refrigerant flowing through said refrigerant vapor line;

wherein said refrigerant-to-refrigerant heat exchanger has a first refrigerant pass and a second refrigerant pass disposed in heat exchange relationship, the first refrigerant pass interdisposed in the primary refrigerant circuit intermediate the refrigerant heat rejection heat exchanger and said secondary expansion valve, the second refrigerant pass in refrigerant flow communication with said refrigerant vapor line;

a first economizer flow control device interdisposed in said refrigerant vapor line intermediate said flash tank and an intermediate stage of said compression device;

a refrigerant bypass line establishing refrigerant flow communication between said refrigerant vapor line at a point upstream with respect to refrigerant flow and said refrigerant vapor line at a point downstream with respect to refrigerant flow, the second refrigerant pass of said refrigerant-to-refrigerant heat exchanger interdisposed in said refrigerant bypass line;

a second economizer flow control device interdisposed in said refrigerant bypass line upstream with respect to refrigerant flow of the second refrigerant pass of said refrigerant-to-refrigerant heat exchanger;

a third flow control device interdisposed in an upstream portion of said refrigerant liquid line;

a fourth flow control device disposed upstream with respect to refrigerant flow of said intermediate pressure stage of said compression device and downstream with respect to refrigerant flow of both said first economizer flow control device and said second economizer flow control device and said third flow control device; and a fifth flow control device disposed upstream with respect to refrigerant flow of said suction pressure portion of said primary refrigerant circuit and downstream with respect to refrigerant flow of both said first economizer flow control device and said second economizer flow control device and said third flow control device.

13. A refrigerant vapor compression system as recited in claim 12 wherein each of said first economizer flow control device, said second economizer flow control device, said third flow control device, said fourth flow control device and fifth flow control device comprises a solenoid valve having a first open position and a second closed position.

14. A refrigerant vapor compression system as recited in claim 1 wherein said system is incorporated in a transport refrigeration system for conditioning a temperature controlled cargo storage region.

15. A refrigerant vapor compression system as recited in claim 14 wherein said system operates in a transcritical cycle.

16. A refrigerant vapor compression system as recited in claim 15 wherein the refrigerant comprises carbon dioxide.

* * * * *